US012275306B2

(12) United States Patent
Kitamura et al.

(10) Patent No.: US 12,275,306 B2
(45) Date of Patent: Apr. 15, 2025

(54) SERIES HYBRID TYPE STRADDLED VEHICLE

(71) Applicant: YAMAHA HATSUDOKI KABUSHIKI KAISHA, Iwata (JP)

(72) Inventors: Naoki Kitamura, Shizuoka (JP); Yasushi Takemoto, Shizuoka (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 711 days.

(21) Appl. No.: 17/504,837

(22) Filed: Oct. 19, 2021

(65) Prior Publication Data
US 2022/0032765 A1 Feb. 3, 2022

Related U.S. Application Data

(63) Continuation-in-part of application No. PCT/JP2020/016386, filed on Apr. 14, 2020.

(30) Foreign Application Priority Data

Apr. 19, 2019 (JP) .................. 2019-080271

(51) Int. Cl.
B60K 6/46 (2007.10)
B60K 6/54 (2007.10)
(Continued)

(52) U.S. Cl.
CPC ............ B60K 6/46 (2013.01); B62K 11/04 (2013.01); B62M 7/02 (2013.01); B60K 6/54 (2013.01);
(Continued)

(58) Field of Classification Search
CPC . B60K 6/46; B60K 6/54; B62K 11/04; B62M 7/02; B60Y 2200/126;
(Continued)

(56) References Cited

U.S. PATENT DOCUMENTS

2012/0285762 A1 11/2012 Weicheng
2013/0292198 A1 11/2013 Matsuda
(Continued)

FOREIGN PATENT DOCUMENTS

EP 1457413 A2 * 9/2004 ............. B62K 11/10
EP 1707484 A1 * 10/2006 ............. B62M 7/06
(Continued)

Primary Examiner — Jacob D Knutson
(74) Attorney, Agent, or Firm — Rabin & Berdo, P.C.

(57) ABSTRACT

A straddled vehicle including a frame structure having a frame body, a rear arm swingably supported by the frame structure, a driving wheel rotatably supported by the rear arm, a drive motor supported by the frame structure or the rear arm, and an electric power generation unit supported by the frame body but not by the rear arm. The electric power generation unit includes: an electric power generation engine arranged with an offset toward a first direction from a center of the straddled vehicle with respect to a left-right direction, not overlapping the drive motor in a side view; and an electric power generator further in a second direction, opposite to the first direction, than the electric power generation engine, overlapping the electric power generation engine, but not overlapping the drive motor, in the side view. The electric power generator is driven by the electric power generation engine to generate electric power.

12 Claims, 11 Drawing Sheets

(51) Int. Cl.
  *B62K 11/04* (2006.01)
  *B62M 7/02* (2006.01)
  *F16H 57/02* (2012.01)

(52) U.S. Cl.
  CPC ..... *B60Y 2200/126* (2013.01); *B60Y 2200/92* (2013.01); *F16H 2057/02034* (2013.01); *F16H 2057/02065* (2013.01)

(58) Field of Classification Search
  CPC ....... B60Y 2200/92; F16H 2057/02034; F16H 2057/02065
  See application file for complete search history.

(56) References Cited

U.S. PATENT DOCUMENTS

2017/0256106 A1 9/2017 Hino
2019/0047655 A1 2/2019 Aydoung et al.

FOREIGN PATENT DOCUMENTS

| | | | | |
|---|---|---|---|---|
| EP | 1733961 A2 | * | 12/2006 | ............ B62M 7/12 |
| JP | 10297570 A | * | 11/1998 | ............ B60K 6/543 |
| JP | H10297570 A | | 11/1998 | |
| JP | H1159543 A | | 3/1999 | |
| JP | 2005132284 A | | 5/2005 | |
| JP | 2006044495 A | * | 2/2006 | ............ B60K 6/383 |
| JP | 2007008349 A | * | 1/2007 | ............ B60K 6/44 |
| JP | 3942772 B2 | | 7/2007 | |
| JP | 2007209188 A | | 8/2007 | |
| JP | 2012111278 A | | 6/2012 | |
| JP | 2015085797 A | | 5/2015 | |
| JP | 2016193628 A | | 11/2016 | |
| JP | 2018012346 A | | 1/2018 | |
| JP | 2019506333 A | | 3/2019 | |
| KR | 2012132516 A | * | 12/2012 | ............ B60K 6/48 |
| WO | 2005063559 A1 | | 7/2005 | |
| WO | 2011121785 A1 | | 10/2011 | |
| WO | 2012090243 A1 | | 7/2012 | |

\* cited by examiner

SERIES HYBRID TYPE STRADDLED VEHICLE

CROSS-REFERENCE TO RELATED APPLICATIONS

This is a continuation-in-part application of International Application PCT/JP2020/016386 filed on Apr. 14, 2020, which claims priority from a Japanese Application No. 2019-080271, filed on Apr. 19, 2019. The contents of the applications are incorporated herein by reference.

TECHNICAL FIELD

The present teaching relates to a series hybrid type straddled vehicle.

BACKGROUND ART

Patent Literature 1 (PTL 1) shows a series hybrid type straddled vehicle of which the driving wheel is driven by a motor. The series hybrid type straddled vehicle according to PTL 1 has rotational power components such as an engine, an electric power generator, a battery, a drive motor, a control unit, and the like. Of the rotational power components in the series hybrid type straddled vehicle according to PTL 1, the engine is arranged above the electric power generator and they are housed in a box-like shroud, and the engine and the electric power generator are fixed to a frame via the shroud.

CITATION LIST

Patent Literature

PTL 1: Japanese Patent No. 3942772

SUMMARY OF INVENTION

Technical Problem

The series hybrid type straddled vehicle, according to PTL 1, is a series hybrid type power-assisted bicycle. The power-assisted bicycle travels with human power assisted by rotational power of a motor. The motor of the straddled vehicle, according to PTL 1, is supplied with an amount of electric power from the electric power generator driven by the engine or from the battery, the amount being an amount enough to assist human power. In this respect, it is required that the series hybrid type straddled vehicle is to be capable of a large output like that of, for example, a motorcycle. This is why the engine and the electric power generator of the series hybrid type straddled vehicle tend to be large in size.

As the engine and the electric power generator of the series hybrid type straddled vehicle are large in size, according to PTL 1, the series hybrid type straddled vehicle itself is large in size, too. Particularly the size in the up-down direction or in the front-back direction is influenced by both the larger size of the engine and the larger size of the electric power generator. If, for example, the engine and the electric power generator are large in size in the front-back direction, a wheelbase and a frame of the series hybrid type straddled vehicle are large in size, too.

The present teaching aims to provide a series hybrid type straddled vehicle capable of increasing an output while suppressing a size increase.

Solution to the Problem

The inventors of the present teaching conducted detailed studies on a function related to driving of a series hybrid type straddled vehicle. In the course of the studies, it was discovered that in the series hybrid type straddled vehicle the following points are considered.

1. Since an electric power generation engine has a large weight, it is preferable that the electric power generation engine is arranged as near as possible to the center of the straddled vehicle.
2. Since rotational power is transmitted from a drive motor to a driving wheel, it is preferable that the distance between the drive motor and the driving wheel is short.
3. Since rotational power is transmitted from the electric power generation engine to an electric power generator, it is preferable that the distance between the electric power generation engine and the electric power generator is short.
4. On the other hand, it is possible that the drive motor and the driving wheel are away from the electric power generator, because it is electric power that is supplied from the electric power generator to the drive motor.
5. It is not always necessary that a rotational power output portion (for example, a CVT pulley) for outputting rotational power to the driving wheel is disposed beside the electric power generation engine when viewed in the front-back direction.

The inventors of the present teaching conducted further detailed studies on the positional relationship between the electric power generation engine and the electric power generator. The inventors of the present teaching tried arranging the electric power generation engine and the electric power generator side by side in the left-right direction. The electric power generation engine has a large weight, and is preferably arranged as near as possible to the center of the series hybrid type straddled vehicle. In this respect, however, it was discovered that in a case of arranging the electric power generation engine and the electric power generator side by side in the left-right direction, the electric power generation engine may be allowed to be arranged off-set from the center with respect to the left-right direction. If both the electric power generation engine and the electric power generator, which are large in size, are arranged side by side in the left-right direction, the increase in the dimensional amount of an electric power generation unit is smaller in the up-down and front-back directions than the increase in the total dimensional amount of both electric power generation engine and electric power generator when not arranged side-by-side. An increase in the dimensions in up-down and front-back directions can be suppressed accordingly. In addition, an output of the series hybrid type straddled vehicle can be increased.

A series hybrid type straddled vehicle, according to the present teaching accomplished based on the above-described findings, has the following configuration.

(1) A series hybrid type straddled vehicle includes:
a frame body that constitutes a frame structure;
a rear arm that is supported in a swingable manner by the frame structure;
a driving wheel that is supported in a rotatable manner by the rear arm;
a drive motor that is supported by the frame structure or the rear arm, the drive motor being configured to drive the driving wheel; and an electric power generation unit including an electric power generation engine and an electric power generator, the electric power generation engine being arranged off-set toward a first direction from the center of the series hybrid type straddled vehicle with respect to a left-right direction of the series hybrid type straddled vehicle, provided that the left-right direction is composed of the first direction and a second direction opposite to the first direction, the electric power generation engine being positioned so as not to overlap the drive motor when viewed in the left-right direction, the electric power generator being positioned farther in the second direction than the electric power generation engine, the electric power generator being arranged so as to have an overlap with the electric power generation engine when viewed in the left-right direction, the electric power generator being arranged so as not to overlap the drive motor when viewed in the left-right direction, the electric power generator being driven by the electric power generation engine to generate electric power for driving the drive motor, the electric power generation unit being unsupported by the rear arm but supported by the frame body such that the electric power generation unit constitutes the frame structure or does not constitute the frame structure.

The series hybrid type straddled vehicle according to (1) includes the frame body, the rear arm, the driving wheel, the drive motor, and the electric power generation unit.

The frame body constitutes the frame structure. The rear arm is supported in a swingable manner by the frame structure. The driving wheel is supported in a rotatable manner by the rear arm. The drive motor is supported by the frame structure or the rear arm, and drives the driving wheel.

The electric power generation unit includes the electric power generation engine and the electric power generator. The electric power generation engine is arranged off-set toward the first direction from the center of the series hybrid type straddled vehicle with respect to the left-right direction of the series hybrid type straddled vehicle, and is positioned so as not to overlap the drive motor when viewed in the left-right direction of the series hybrid type straddled vehicle. The electric power generator is positioned farther in the second direction than the electric power generation engine, and is arranged so as to have an overlap with the electric power generation engine when viewed in the left-right direction. The electric power generator is arranged so as not to overlap the drive motor when viewed in the left-right direction. The electric power generator is driven by the electric power generation engine, to generate electric power. The electric power generator generates electric power for driving the drive motor.

The electric power generation unit is supported by the frame body such that the electric power generation unit constitutes or does not constitute the frame structure.

In the series hybrid type straddled vehicle according to (1), the electric power generation unit including the electric power generator and the electric power generation engine is unsupported by the rear arm but instead supported by the frame body. In the series hybrid type straddled vehicle having such a configuration, the electric power generation engine is off-set toward the first direction from the center of the series hybrid type straddled vehicle with respect to the left-right direction, and the electric power generator is positioned farther in the second direction than the electric power generation engine. This allows the electric power generator and the electric power generation engine to be arranged with an overlap with each other when viewed in the left-right direction, while suppressing the amount of protrusion of the electric power generator in the left-right direction.

The travel performance of the series hybrid type straddled vehicle depends on electric power that can be supplied to the drive motor. In order to keep up with an increase of electric power that can be supplied to the drive motor, the electric power generation engine and the electric power generator, which generate electric power, are large in size. In the series hybrid type straddled vehicle according to (1), the electric power generator and the electric power generation engine are arranged so as to have an overlap with each other when viewed in the left-right direction. With this configuration, for example, if each of the electric power generation engine and the electric power generator is large in size, the increase in the dimensional amount of the entire electric power generation unit can be made smaller in the up-down and front-back directions than the increase in the total dimensional amount of both electric power generation engine and electric power generator when not arranged side-by-side. Accordingly, in the series hybrid type straddled vehicle according to (1), even when both the electric power generation engine and the electric power generator are, in order to meet the requirements for an increased output, large in size, the dimension sizes in the up-down and front-back directions can be suppressed. They are smaller in comparison to, for example, the series hybrid type straddled vehicle according to PTL 1. In addition, even if the output increases, a size increase of the series hybrid type straddled vehicle can be suppressed. It should be noted that the left-right direction of the series hybrid type straddled vehicle is composed of the first direction and the second direction. The first direction is either one of the left direction or the right direction, and the second direction is the other.

In an aspect of the present teaching, the series hybrid type straddled vehicle can adopt the following configuration.

(2) The series hybrid type straddled vehicle according to (1) is configured such that
  the electric power generation unit is supported in a swingable manner by the frame body such that the electric power generation unit does not constitute the frame structure.

In the series hybrid type straddled vehicle according to (2), the electric power generation unit is supported in a swingable manner by the frame body such that the electric power generation unit does not constitute the frame structure. This can suppress propagation of vibration generated in the electric power generation unit to the frame body.

In an aspect of the present teaching, the series hybrid type straddled vehicle can adopt the following configuration.

(3) The series hybrid type straddled vehicle according to (1) is configured such that
  the electric power generation unit constitutes the frame structure by being rigidly fixed to the frame body.

In the series hybrid type straddled vehicle according to (3), the electric power generation unit constitutes the frame structure by being rigidly fixed to the frame body. Thus, the electric power generation unit can be used as a rigid member of the frame structure. This can suppress a size increase of the series hybrid type straddled vehicle, and at the same time can enhance the rigidity of the frame structure.

(4) A series hybrid type straddled vehicle according to any one of (1) to (3) further includes
  a gear box that accommodates a rotational power transmission mechanism that shifts the speed of power outputted from the drive motor with a predetermined gear ratio, and transmits the resulting power to the driving wheel, the gear box cooperating with the frame body to constitute the frame structure by being rigidly fixed to the frame body, the drive motor being supported by the gear box.

The series hybrid type straddled vehicle according to (4) includes the gear box that accommodates the rotational power transmission mechanism. The gear box, by being rigidly fixed to the frame body, cooperates with the frame body to constitute the frame structure. Accordingly, in the series hybrid type straddled vehicle according to (4), a compact and strong vehicle body can be obtained.

(5) The series hybrid type straddled vehicle according to any one of (1) to (3) is configured such that the drive motor is supported by the rear arm, and drives the driving wheel not via a rotational power transmission mechanism.

In the series hybrid type straddled vehicle according to (5), the drive motor is supported not by the frame structure but by the rear arm. Accordingly, in the series hybrid type straddled vehicle according to (5), a compact vehicle body can be obtained.

(6) The series hybrid type straddled vehicle according to any one of (1) to (3) is configured such that the rear arm supports the drive motor, and accommodates a rotational power transmission mechanism that shifts the speed of power outputted from the drive motor with a predetermined gear ratio, and transmits the resulting power to the driving wheel, and the drive motor drives the driving wheel via the rotational power transmission mechanism.

In the series hybrid type straddled vehicle according to (6), the rear arm supports the drive motor, and accommodates the rotational power transmission mechanism. The drive motor drives the driving wheel via the rotational power transmission mechanism. Accordingly, the vehicle body of the series hybrid type straddled vehicle can be made more compact.

The terminology used herein is for defining particular embodiments only and is not intended to limit the teaching. As used herein, the term "and/or" includes any and all combinations of one or more of the associated listed items. As used herein, the terms "including", "comprising", "having", and variations thereof specify the presence of stated features, steps, elements, components, and/or equivalents thereof, and can include one or more of steps, operations, elements, components, and/or their groups. As used herein, the terms "attached", "connected", "coupled", and/or equivalents thereof are used in a broad sense, and include both of direct and indirect attachment and coupling unless otherwise specified. The terms "connected" and "coupled" are not limited to physical or mechanical connection or coupling, and can include direct and indirect electrical connection and coupling. Unless otherwise defined, all terms (including technical and scientific terms) used herein have the same meaning as commonly understood by one of ordinary skill in the art to which the present teaching belongs. It will be further understood that terms, such as those defined in commonly used dictionaries, should be interpreted as having a meaning that is consistent with their meaning in the context of the present teaching and relevant art and should not be interpreted in an idealized or overly formal sense unless expressly so defined herein. It will be understood that the description of the present teaching discloses the number of techniques and steps. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

Description herein will give an explanation about a novel series hybrid type straddled vehicle. In the description given below, for the purposes of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

The series hybrid type straddled vehicle (straddled vehicle) refers to a vehicle of a type including a saddle on which a driver can sit astride. Examples of the straddled vehicle encompass a scooter type motorcycle, a moped type motorcycle, an offroad type motorcycle, and an onroad type motorcycle. The straddled vehicle is not limited to motorcycles. Alternatively, for example, the straddled vehicle may be a three-wheeled motor vehicle, an all-terrain vehicle (ATV), or the like. The three-wheeled motor vehicle may include two front wheels and one rear wheel. Alternatively, the three-wheeled motor vehicle may include one front wheel and two rear wheels. The driving wheel of the straddled vehicle may be either a rear wheel or a front wheel. Alternatively, both the rear wheel and the front wheel may serve as driving wheels of the series hybrid type straddled vehicle.

The series hybrid type straddled vehicle is preferably capable of making a turn in a leaning posture. The straddled vehicle capable of making a turn in a leaning posture is configured to make a turn while leaning toward the inside of a curve. With this, the straddled vehicle capable of making a turn in a leaning posture can resist against a centrifugal force acting on the straddled vehicle during a turn. The straddled vehicle capable of making a turn in a leaning posture may be a motorcycle or a three-wheeled motor vehicle, for example. Since it is required that the straddled vehicle capable of making a turn in a leaning posture is to have agility, the responsiveness of running to a manipulation for starting is highly valued.

In the series hybrid type straddled vehicle, the driving wheel is driven by power that is outputted from the drive motor. The driving wheel is separated from a path through which rotational power from the crankshaft is transmitted. The driving wheel, therefore, is configured such that power outputted by the electric power generation engine is not mechanically transmitted to the driving wheel. That is, the series hybrid type straddled vehicle in the present disclosure does not encompass a so-called series-parallel hybrid type straddled vehicle.

The frame structure is a part that forms a framework of the straddled vehicle. In a case where the electric power generation unit constitutes the frame structure, the frame structure includes the frame body and the electric power generation unit. In a case where the electric power generation unit does not constitute the frame structure, the frame structure includes the frame body. The frame structure may be constituted by the frame body in combination with a rigid part that is rigidly fixed to the frame body. The frame body is a part that serves as a base for supporting main parts, etc, of the straddled vehicle. The frame structure bears loads from the front wheel, the rear wheel, and the electric power generation engine of the straddled vehicle. Non-limiting examples of the frame body include a single cradle, a double cradle, a diamond type, and a monocoque type.

The electric power generation unit includes the electric power generation engine and the electric power generator. The electric power generation unit converts rotational power outputted from the electric power generation engine into electric power.

The electric power generation engine is a reciprocating engine that generates power by gas combustion, and outputs the power in the form of a torque and a rotation speed of the crankshaft. The electric power generation engine encompasses, for example, a single cylinder engine and an engine having two or more cylinders. Non-limiting examples of the electric power generation engine include a rotary engine and a gas turbine engine in addition to the reciprocating engine that generates power by gas combustion, and outputs the power in the form of a torque and a rotation speed of the crankshaft.

The electric power generator is a rotating electric machine capable of generating electric power. The electric power generator may function as a starter motor. The electric power generator may be a rotating electric machine different from a starter motor. The electric power generator may be either of outer rotor type or of inner rotor type. The electric power generator may be either of radial gap type or of axial gap type. In an embodiment, the electric power generator has a rotor including a permanent magnet.

The configuration in which the electric power generator is driven by the electric power generation engine is, for example, a configuration in which the electric power generator is provided so as to interlock with the crankshaft of the electric power generation engine, and a driven shaft of the electric power generator is connected to the crankshaft of the electric power generation engine via the rotational power transmission mechanism such that the driven shaft is rotated at a fixed speed ratio. A configuration in which the electric power generator is directly coupled to the crankshaft of the electric power generation engine without interposition of the rotational power transmission mechanism may be possible, too.

The drive motor is a rotating electric machine capable of motor operations. The drive motor may be a rotating electric machine capable of both electric power generation and motor operations, for example. The drive motor may be either of outer rotor type or inner rotor type. The drive motor may be either of radial gap type or of axial gap type. In an embodiment, the drive motor has a rotor including a permanent magnet.

Rotational power outputted from the drive motor is transmitted to the driving wheel supported by the rear arm, via a chain, a belt, a rotation shaft, or a combination of gears, for example. The drive motor may be a so-called in-wheel motor. In this case, the driving wheel is supported by the rear arm with interposition of the drive motor.

The driving wheel may be either the rear wheel or the front wheel. Alternatively, both the rear wheel and the front wheel may serve as driving wheels.

The rear arm is a part connecting the rear wheel to the frame structure. The rear arm supports the rear wheel in a rotatable manner. The rear arm is supported in a swingable manner by the frame structure.

The wording "supporting" means that a supporting part directly or indirectly bears a load of a supported part. The wording "supported" means that a supported part directly or indirectly applies a load to a supporting part. Here, the wording "directly" means that the supporting part bears a load from the supported part while being in contact with the supported part. The wording "indirectly" means that the supporting part bears a load from the supported part via another part, without being in contact with the supported part. A contact point between the supporting part and the supported part may be fixed, for example. The supporting part and the supported part may be connected in a swingable manner, for example. The supporting part and the supported part may be connected in a rotatable manner, for example. A connecting portion between the supporting part and the supported part may be where the parts are directly connected to each other. The connecting portion between the supporting part and the supported part may be where the parts are connected to each other via an elastic member, a link mechanism, or the like, for example.

The wording "rigidly fixed" means that a supported part is directly or indirectly fixed to a supporting part without interposition of a movable part including an elastic member, a buffer member, or the like. The supported part is, for example, fixed to the supporting part at three or more points.

The wording "supported by the frame structure so as not to constitute the frame structure" means, for example, that the front wheel and the rear wheel, etc, are supported by the frame structure such that the front wheel and the rear wheel bear no load or a lower load from a part than a load that the frame structure bears from the part. The supporting is implemented by, for example, attaching at one or more points to the frame structure via or not via an elastic member such as a rubber. The supporting may be implemented by attaching at two or more points to the frame structure via an elastic member such as a rubber and a link mechanism.

In a case where the series hybrid type straddled vehicle is a two-wheeled vehicle, the center of the series hybrid type straddled vehicle with respect to the left-right direction of the series hybrid type straddled vehicle is represented by a vertical plane including the center of the front wheel and the center of the rear wheel under a state where the vehicle is upright. In a case where the series hybrid type straddled vehicle has two front wheels or two rear wheels, the center of the series hybrid type straddled vehicle is represented by a vertical plane including a position that is equally distant from the respective centers of the two front wheels with respect to the left-right direction, or a position that is equally distant from the respective centers of the two rear wheels with respect to the left-right direction.

The position of the electric power generation engine is based on a vertical plane including the center line of a cylinder of the engine mounted to the vehicle in the upright state. In a case where the electric power generation engine has two cylinders, a vertical plane including a position that is equally distant from the respective center lines of the two cylinders serves as a basis.

The state of "having an overlap" includes a state where two or more objects have their portions overlap each other. That is, a partially overlapping state is included. Having an overlap also includes a case where objects completely overlap each other.

The state of "not overlapping" means that all of two or more objects have no portion overlap each other.

Advantageous Effects of Invention

According to the present teaching, a straddled vehicle can be provided capable of increasing an output while suppressing a size increase.

DESCRIPTION OF EMBODIMENTS

In the following, the present teaching will be described based on preferred embodiments with reference to the drawings.

First Embodiment

Figure 1:
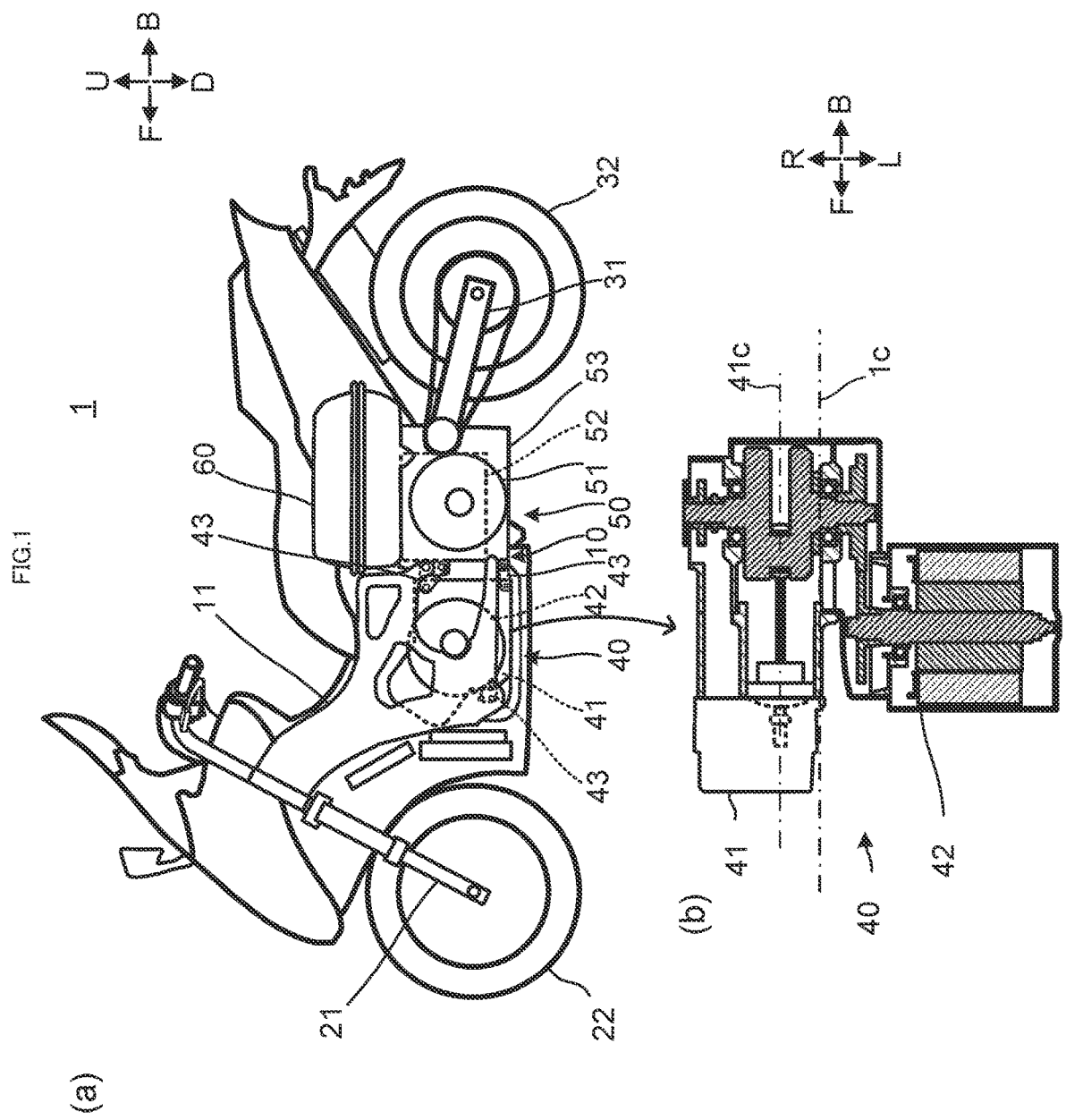
FIG. 1 A diagram showing an external appearance of a straddled vehicle according to a first embodiment of the present teaching FIG. 2 A left side view showing an electric power generation unit of the straddled vehicle shown in FIG. 1

FIG. 1 shows a series hybrid type straddled vehicle 1 according to a first embodiment of the present teaching. The part (a) of FIG. 1 shows an external appearance of the straddled vehicle 1 with its left vehicle body covering being removed. The part (b) of FIG. 1 is a cross-sectional view schematically showing an electric power generation unit of the straddled vehicle 1.

Referring to FIG. 1, overview of the series hybrid type straddled vehicle 1 according to this embodiment will be described. In FIG. 1, the arrow F represents the frontward direction of the series hybrid type straddled vehicle 1. The frontward direction is a direction in which the series hybrid type straddled vehicle 1 travels. The arrow B represents the backward (rearward) direction. The arrow F and the arrow B represent the front-back (front-rear) direction FB of the series hybrid type straddled vehicle 1. The frontward direction F, the backward direction B, and the front-back direction FB are parallel to a horizontal plane under a state where the series hybrid type straddled vehicle 1 is upright. The arrow U represents the upward (upper) direction. The arrow D represents the downward (lower) direction. The arrow U and the arrow D represent the up-down direction UD of the series hybrid type straddled vehicle 1. The upward direction U, the downward direction D, and the up-down direction UD are parallel to the vertical direction under a state where the series hybrid type straddled vehicle 1 is upright. The part (b) of FIG. 1 shows the arrow L and the arrow R, which represent the right direction and the left direction from the perspective of a rider riding on a lean vehicle. The arrow L and the arrow R represent the left-right direction LR of the series hybrid type straddled vehicle 1.

In Description herein, directions in relation to a device included in the series hybrid type straddled vehicle 1 are described by using the foregoing directions, assuming a state where the device is mounted to the series hybrid type straddled vehicle 1.

In the series hybrid type straddled vehicle 1 (hereinafter, referred to as the straddled vehicle 1) according to this embodiment, an electric power generator is driven by an electric power generation engine, and a driving wheel is driven by electric power of the electric power generator.

The straddled vehicle 1 shown in FIG. 1 includes a frame structure 10. The frame structure 10 is constituted by a frame body 11. In other words, the straddled vehicle 1 shown in FIG. 1 includes the frame body 11.

The straddled vehicle 1 includes a front fork 21 and a front wheel 22. The front wheel 22 is supported in a rotatable manner by the front fork 21. The front fork 21 is supported in a rotatable manner by the frame structure 10. The frame structure 10 bears a load from the front wheel 22 via the front fork 21.

The straddled vehicle 1 includes a rear arm 31 and a rear wheel 32. The rear wheel 32 is supported in a rotatable manner by the rear arm 31. The rear arm 31 is supported in a swingable manner by the frame structure 10. The frame structure 10 bears a load from the rear wheel 32 via the rear arm 31.

The straddled vehicle 1 includes a drive motor 51. The drive motor 51 drives the rear wheel 32. The rear wheel 32 is a driving wheel. Thus, the drive motor 51 drives the driving wheel.

The straddled vehicle 1 includes a control unit 52. The control unit 52 controls electric power to be supplied from an electric power generation unit 40 to the drive motor 51. The control unit 52 controls electric power to be supplied from an electric power generator 42 to a battery 60.

The straddled vehicle 1 includes a gear box 53. The gear box 53 accommodates gears via which the speed of rotational power from the drive motor 51 is shifted with a predetermined gear ratio, and then is transmitted to the rear wheel 32 serving as the driving wheel. In this embodiment, the gear box 53 is rigidly fixed to the frame body 11. The gear box 53, therefore, is unified with the frame body 11, to constitute the frame structure 10. The gear box 53 supports the drive motor 51. That is, the drive motor 51 is supported by the frame structure 10. The drive motor 51, the control unit 52, and the gear box 53 constitute the drive unit 50.

The straddled vehicle 1 includes an electric power generation engine 41 and the electric power generator 42. The electric power generation engine 41 and the electric power generator 42 constitute the electric power generation unit 40.

The electric power generation unit 40 is supported by the frame body 11 such that the electric power generation unit 40 does not constitute the frame structure 10. The electric power generation unit 40 is unsupported by the rear arm 31.

The electric power generation engine 41 has a rotatable crankshaft 411 (not shown). The electric power generation engine 41 generates power by gas combustion, and outputs the power in the form of a torque and a rotation speed of the crankshaft 411.

As shown in the part (b) of FIG. 1, the electric power generation engine 41 is arranged off-set toward a first direction from the center 1c of the straddled vehicle with respect to the left-right direction LR of the straddled vehicle 1, provided that the left-right direction LR is composed of the first direction and a second direction opposite to the first direction. In addition, as shown in the part (a) of FIG. 1, the electric power generation engine 41 is arranged at a position not overlapping the drive motor 51 when viewed in the left-right direction LR of the straddled vehicle 1.

More specifically, in this embodiment, the center 41c of the electric power generation engine 41 is arranged off-set toward the right direction R from the center 1c of the straddled vehicle with respect to the left-right direction LR of the straddled vehicle 1, as shown in the part (b) of FIG. 1. In addition, the electric power generation engine 41 is arranged farther to the front direction F than the drive motor 51 with respect to the front-back direction FB of the straddled vehicle 1.

The electric power generator 42 is provided so as to interlock with the crankshaft 411. The electric power generator 42 is driven by the electric power generation engine 41, to generate electric power for driving the drive motor 51.

The electric power generator 42 is positioned farther in the second direction than the electric power generation engine 41, and is arranged so as to have an overlap with the electric power generation engine 41 when viewed in the left-right direction LR and so as not to overlap the drive motor 51 when viewed in the left-right direction LR.

More specifically, in this embodiment, the electric power generator 42 is positioned farther in the left direction than the electric power generation engine 41, and is arranged so as to have an overlap with the electric power generation engine 41 when viewed in the left-right direction LR and so as not to overlap the drive motor 51 when viewed in the left-right direction LR. That is, the electric power generator 42 is arranged farther to the front direction F than the drive motor 51 with respect to the front-back direction FB of the straddled vehicle 1.

The straddled vehicle 1 includes the battery 60. The battery 60 stores electric power generated by the electric power generator 42, and supplies the stored electric power to the drive motor 51. The battery 60 is arranged above the gear box 53.

Figure 2:
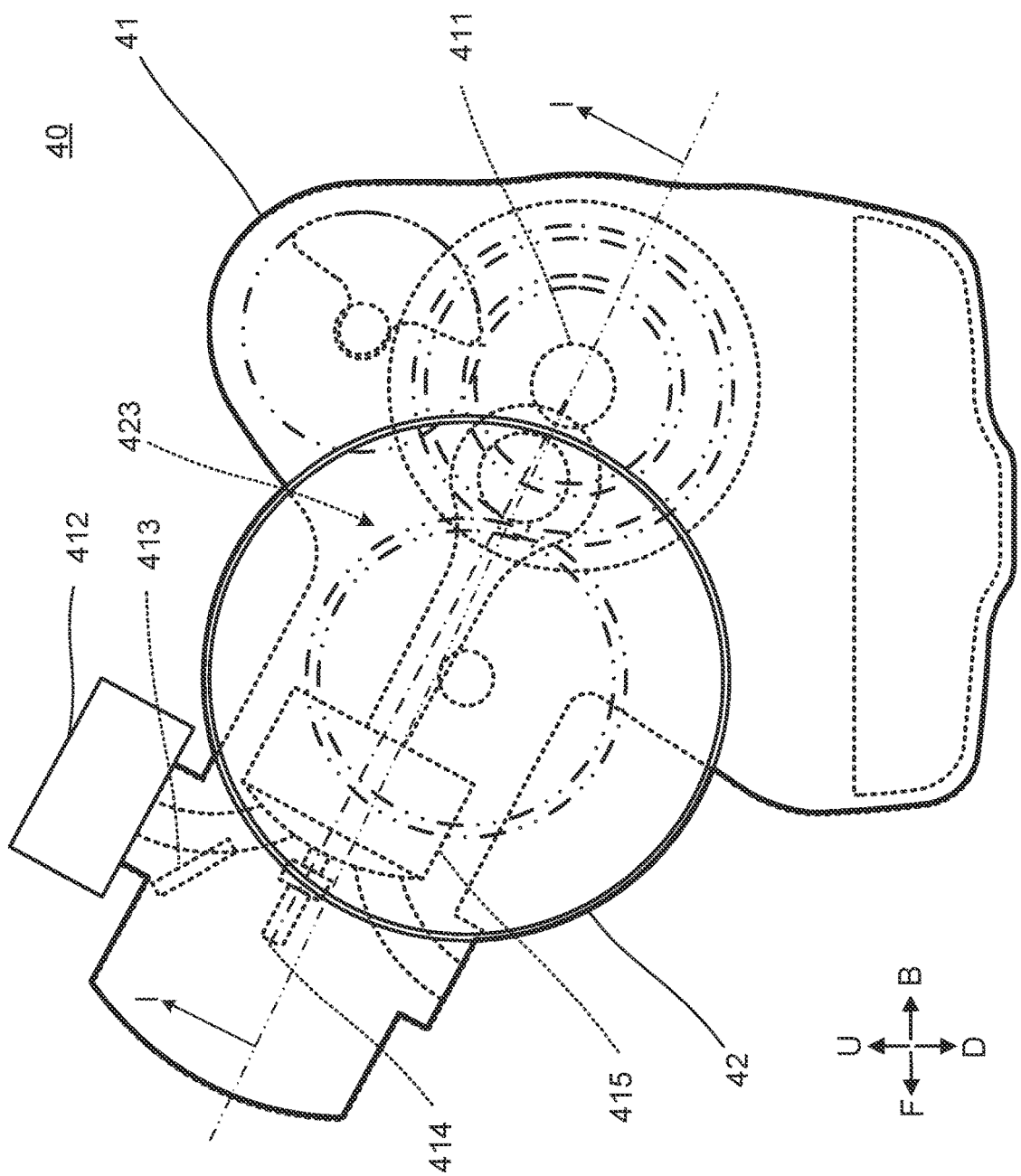
Figure 3:
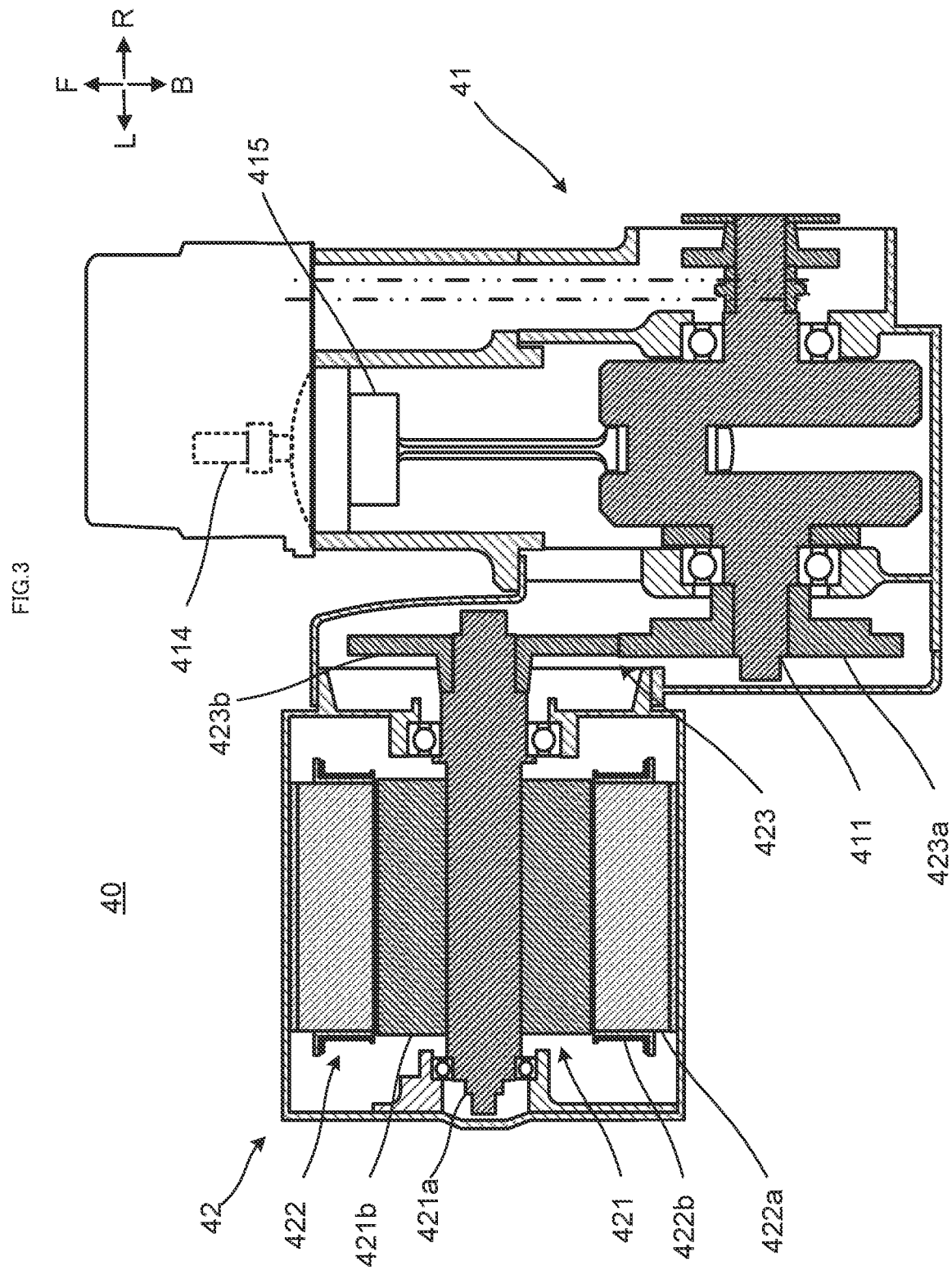
FIG. 3 A cross-sectional view as taken along the line I-I in FIG. 2

FIG. 2 is a left side view showing the electric power generation unit 40 of the straddled vehicle 1 shown in FIG. 1. FIG. 3 is a cross-sectional view as taken along the line I-I in FIG. 2. The electric power generation unit 40 includes the electric power generation engine 41 and the electric power generator 42.

The electric power generation engine 41 is provided with a throttle valve 412, a fuel injection device 413, and a spark plug 414. The throttle valve 412 regulates the amount of air to be supplied to a combustion chamber. The fuel injection device 413 injects a fuel, so that the fuel is supplied to air that the throttle valve 412 is supplying to the combustion chamber. An air/fuel mixture gas is supplied to the combustion chamber. The fuel supply by the fuel injection device 413 and the degree of opening of the throttle valve 412 are regulated in accordance with the amount of electric power required for the straddled vehicle 1 to travel. The spark plug 414 causes the air/fuel mixture gas supplied to the combustion chamber to be burned.

The electric power generation engine 41 is an internal combustion engine. The electric power generation engine 41 is supplied with the fuel. The electric power generation engine 41 outputs rotational power as a result of burning the fuel/air mixture gas in combustion operation. The throttle valve 412 and the fuel injection device 413 adjust the rotational power to be outputted from the electric power generation engine 41, by regulating the amounts of the air and fuel supplied. The throttle valve 412 and the fuel injection device 413 function as a rotational power regulation device that regulates rotational power to be outputted from the electric power generation engine 41.

The electric power generation engine 41 has the rotatable crankshaft 411. The electric power generation engine 41 outputs rotational power via the crankshaft 411. The rotational power of the crankshaft 411 is converted into electric power by the electric power generator 42. The electric power obtained by conversion in the electric power generator 42 is supplied to the drive motor 51 (see FIG. 1), and then is outputted as rotational power again. The rotational power outputted by the drive motor 51 is received by the rear wheel 32. In the straddled vehicle 1, the electric power generation engine 41 and the rear wheel 32 are not in such connection that rotational power transmission therebetween is allowed. Thus, the electric power generation engine 41 does not directly drive the rear wheel 32. In other words, rotational power of the electric power generation engine 41 is not directly received by the rear wheel 32.

The electric power generator 42 is a permanent magnet type three-phase brushless type electric power generator. The electric power generator 42 includes a rotor 421 and a stator 422. The electric power generator 42 of this embodiment is of radial gap type. The electric power generator 42 is of inner rotor type. The rotor 421 is an inner rotor. The stator 422 is an outer stator.

The rotor 421 includes a driven shaft 421a and two or more permanent magnet parts 421b. The two or more permanent magnet parts 421b are disposed on an outer peripheral surface of the driven shaft 421a. The two or more permanent magnet parts 421b are disposed with N-pole and S-pole alternately arranged in the circumferential direction of the electric power generator 42. The two or more permanent magnet parts 421b are disposed closer to the center of the electric power generator 42 than the stator 422 with respect to the radial direction of the electric power generator 42. The rotor 421 does not have a winding to which a current is supplied.

The stator 422 has a stator core 422a and multiphase stator windings 422b. stator core 422a has a yoke having a cylindrical shape and a plurality of teeth arranged at intervals in the circumferential direction of the yoke, the teeth being provided so as to extend inward. Each of the stator windings 422b is wound on each of the teeth. Each of the stator windings 422b belongs to any of U-phase, V-phase, or W-phase. The stator windings 422b are arranged in the order of U-phase, V-phase, and W-phase, for example.

In this embodiment, the electric power generator 42 is arranged farther to the left direction L than the electric power generation engine 41 with respect to the left-right direction LR. The electric power generator 42 is arranged so as to have an overlap with the electric power generation engine 41 when viewed in the left-right direction LR. The electric power generator 42 is arranged such that the driven shaft 421a of the electric power generator 42 is substantially in parallel with the crankshaft 411 of the electric power generation engine 41. The driven shaft 421a of the electric power generator 42 is connected to the crankshaft 411 via a drive gear 423a and a driven gear 423b, which serve as a rotational power transmission mechanism, such that the driven shaft 421a interlocks with the crankshaft 411 of the electric power generation engine 41. More specifically, the rotor 421 is connected to the crankshaft 411 such that the rotor 421 rotates at a fixed speed ratio relative to the crankshaft 411. When the electric power generation engine 41 performs the combustion operation, the electric power generator 42 is driven by the electric power generation engine 41, to generate electric power. In detail, the combustion operation causes a piston 13 of the electric power generation engine 41 to move up and down, so that the crankshaft 411 is rotated. The drive gear 423a attached to the crankshaft 411 of the electric power generation engine 41 transmits rotational power of the crankshaft 411 to the driven gear 423b attached to the driven shaft 421a of the electric power generator 42. The electric power generator 42 generates electric power by the rotor 421 rotating at a location inward of the stator 422 while interlocking with the crankshaft 411.

The electric power generation unit 40 does not constitute the frame structure 10, and is supported by the frame structure 10 by means of floating mount. More specifically, the electric power generation unit 40 is supported by the frame body 11 and the gear box 53 of the frame structure 10. The electric power generation unit 40 is supported by the frame body 11 and the gear box 53 via fixtures 43 (see FIG. 1) each including a link member and an elastic member such as a rubber bush, the supporting being made at four points on the frame body 11 and the gear box 53. The electric power generation unit 40 may be supported by the frame body 11 and the gear box 53 via an elastic member such as a rubber. Attaching the electric power generation unit 40 to the frame body 11 and the gear box 53 in this manner can suppress transmission of vibration of the electric power generation engine to the frame structure 10.

Figure 4:
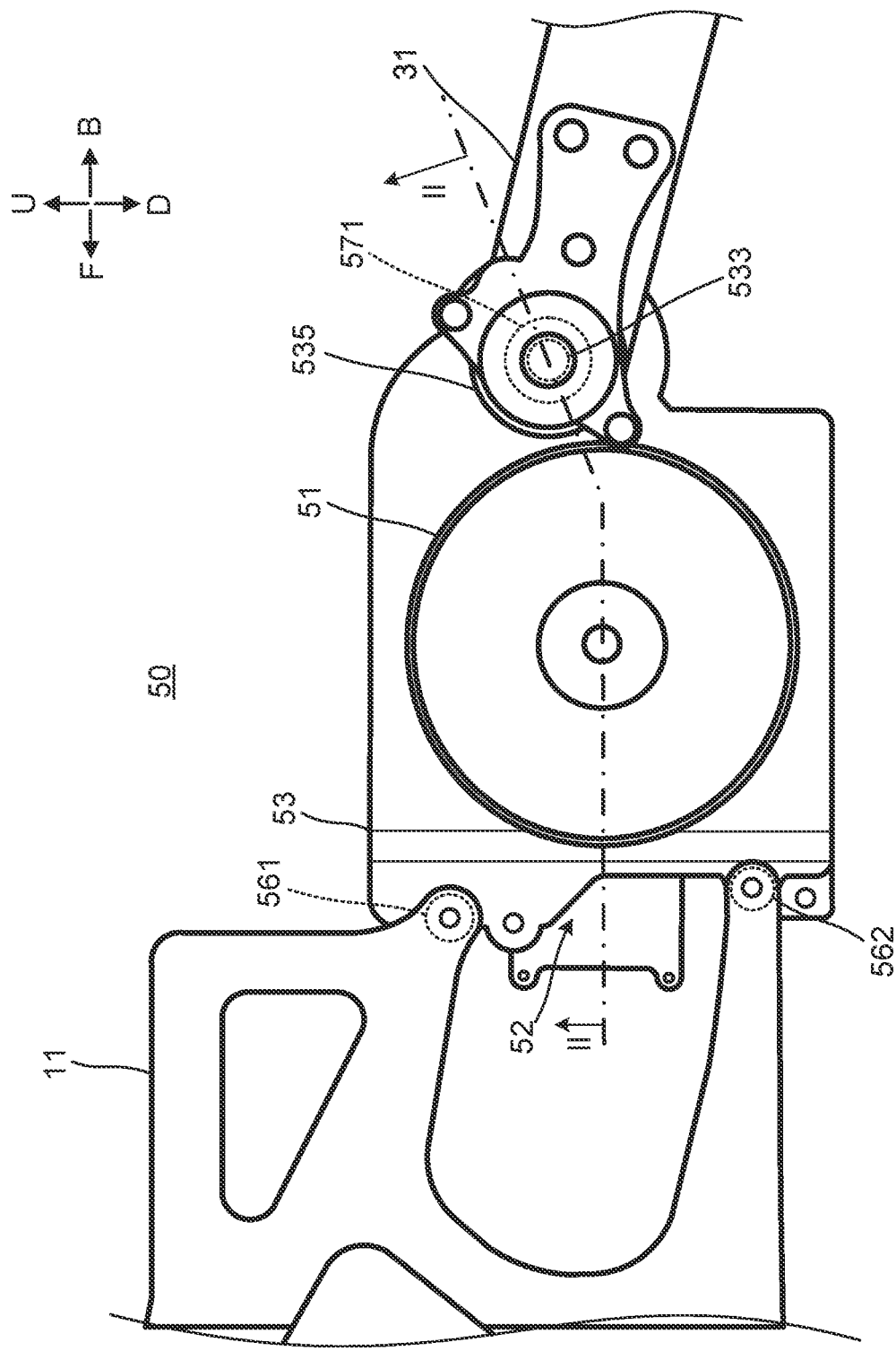
FIG. 4 A left side view showing a drive unit of the straddled vehicle shown in FIG. 1
Figure 5:
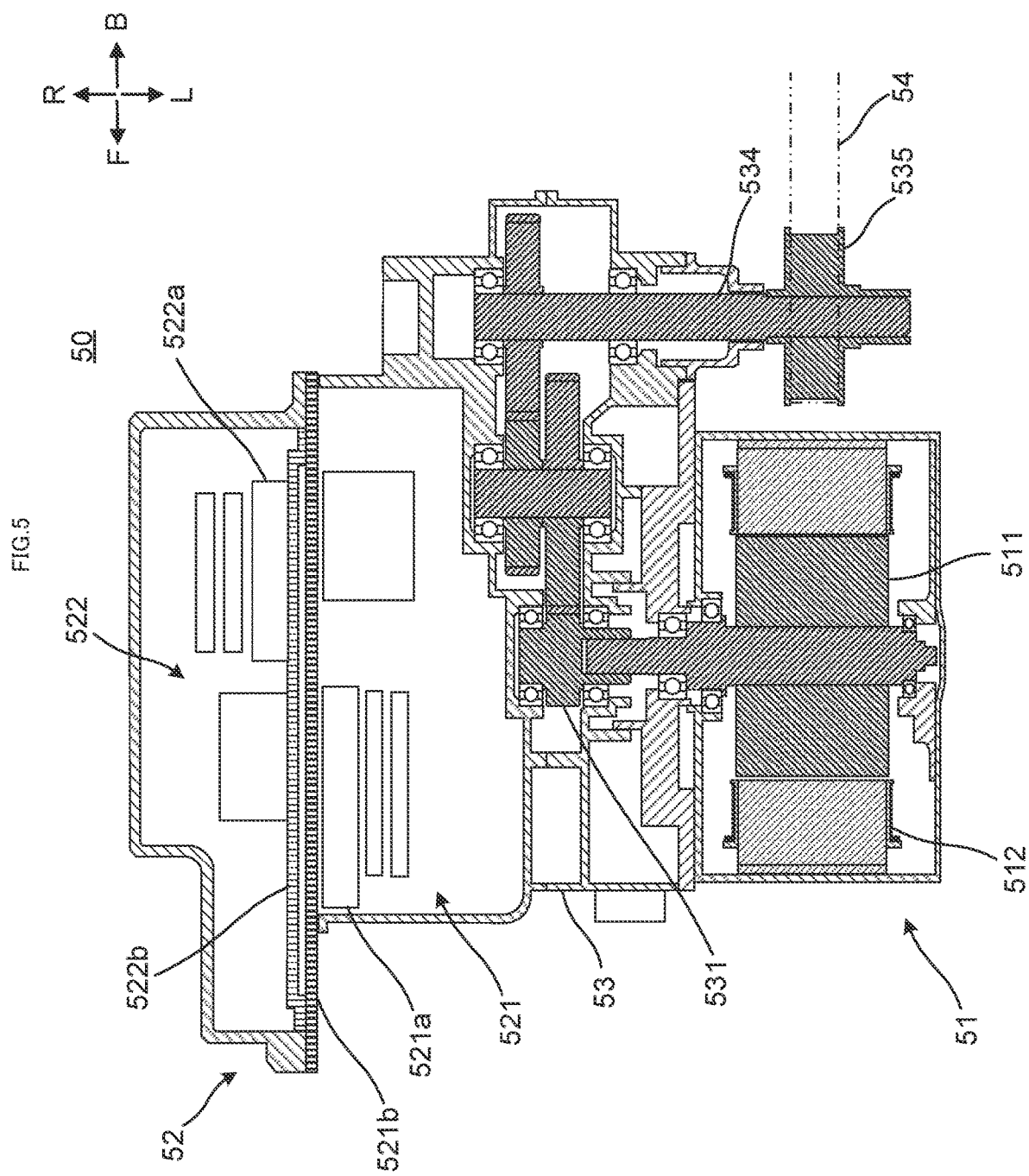
FIG. 5 A cross-sectional view as taken along the line II-II in FIG. 4
Figure 6:
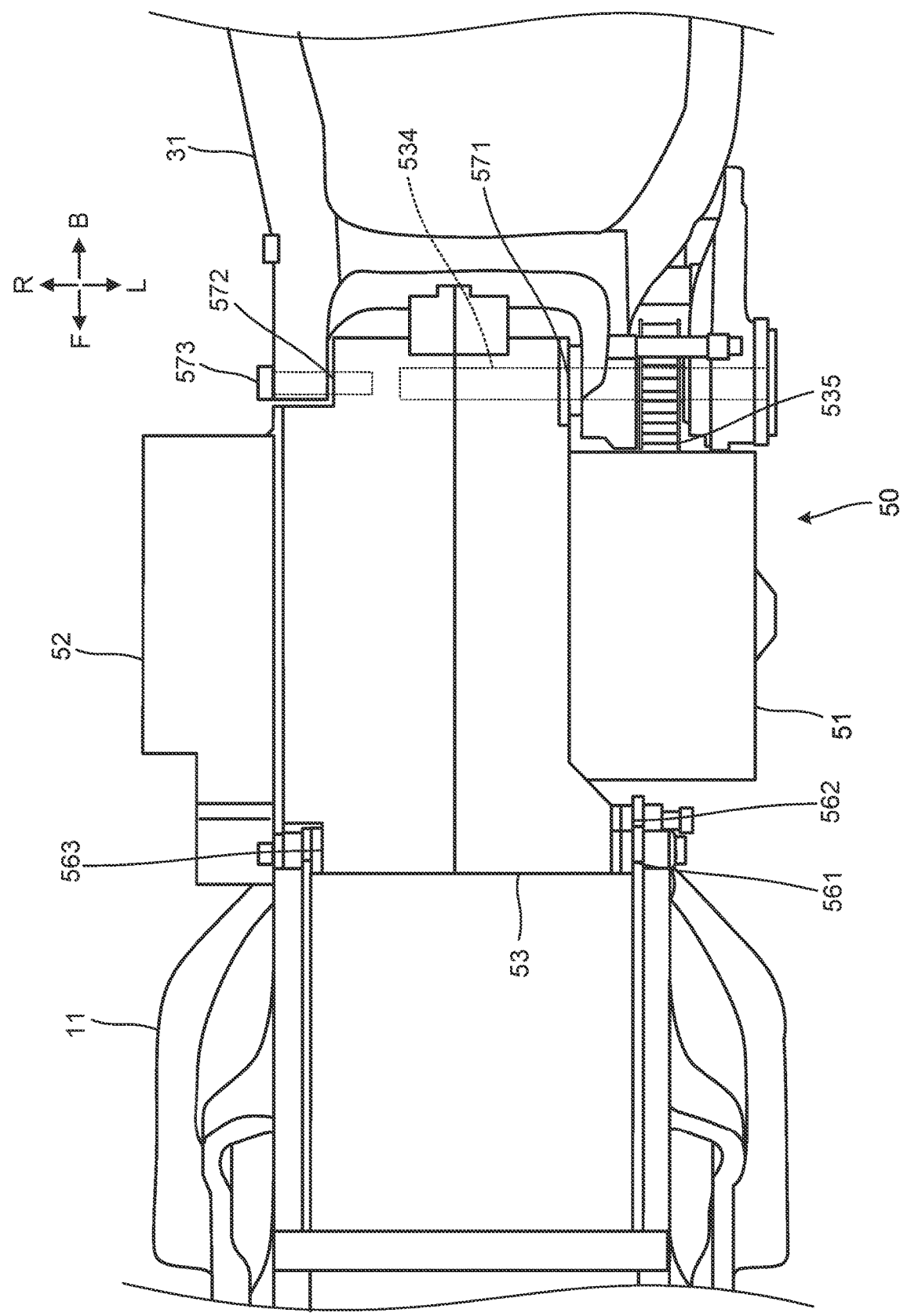
FIG. 6 A top plan view showing the drive unit of the straddled vehicle shown in FIG. 1
Figure 7:
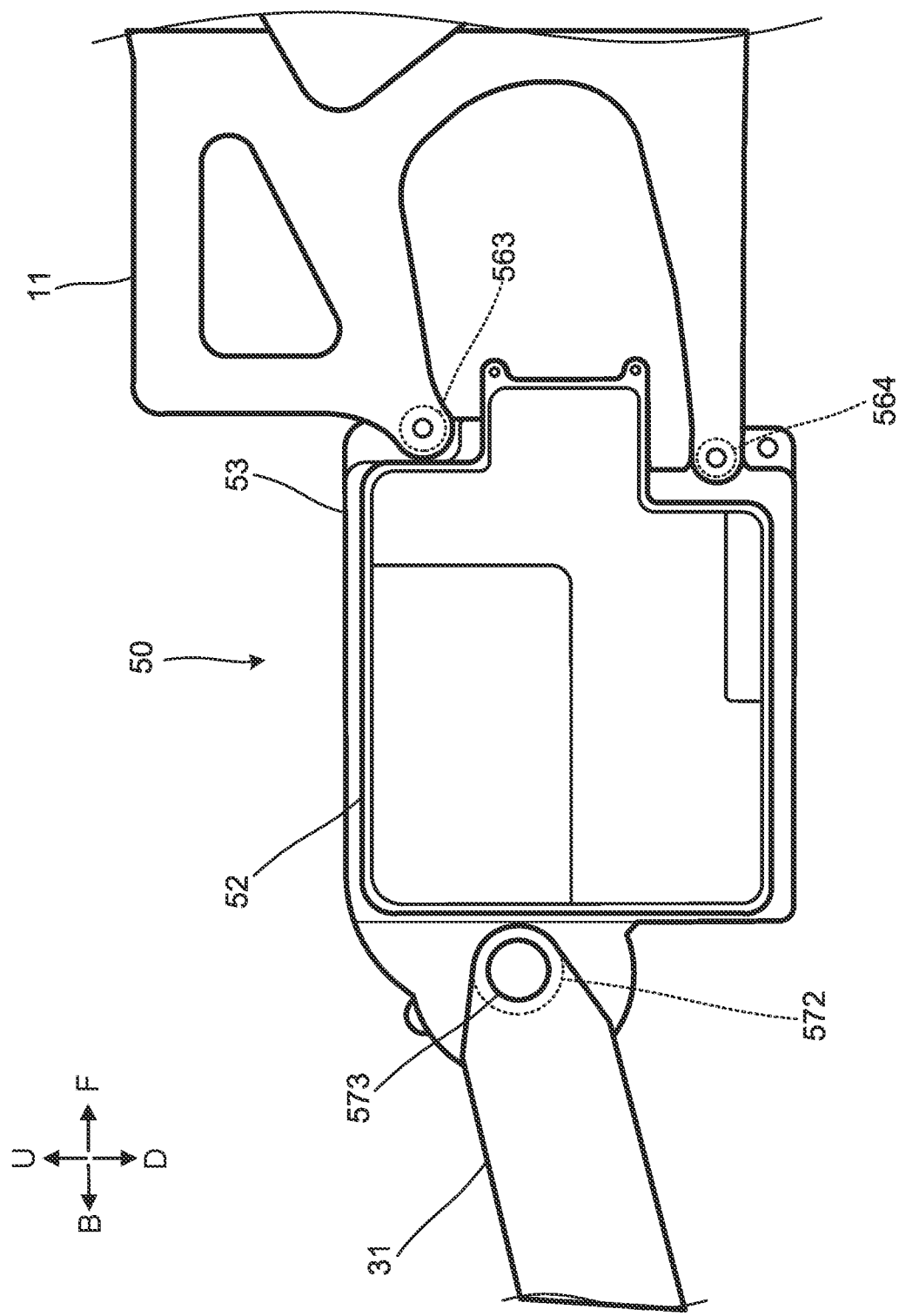
FIG. 7 A right side view showing the drive unit of the straddled vehicle shown in FIG. 1

FIG. 4 is a left side view showing the drive unit 50 of the straddled vehicle 1 shown in FIG. 1. FIG. 5 is a cross-sectional view as taken along the line II-II in FIG. 4. FIG. 6 is a top plan view showing the drive unit 50 of the straddled vehicle 1 shown in FIG. 1. FIG. 7 is a right side view showing the drive unit 50 of the straddled vehicle 1 shown in FIG. 1. The drive unit 50 includes the drive motor 51, the control unit 52, and the gear box 53.

The drive motor 51 is a permanent magnet type three-phase brushless type motor. The drive motor 51 functions also as a permanent magnet type three-phase brushless type electric power generator. The drive motor 51 is of radial gap type, having an inner rotor 511 and an outer stator 512.

The drive motor 51 serves as a vehicle driving motor to drive the rear wheel 32 (see FIG. 1). At this time, the drive motor 51 is supplied with electric power from at least one of the electric power generator 42 (see FIG. 2) of the electric power generation unit 40 or the battery 60 (see FIG. 1). The drive motor 51 uses the supplied electric power to output rotational power, and drives the rear wheel 32 via a rotational power transmission mechanism 531 in the gear box 53.

The control unit 52 includes a drive control unit 521 and a power source control unit 522. The drive control unit 521 includes an inverter module 521a and an attachment board 521b, the inverter module 521a including an inverter and a motor controller. The inverter module 521a is attached to the attachment board 521b of the drive control unit 521. The power source control unit 522 includes a converter module 522a and an attachment board 522b, the converter module 522a including a converter and an electric power generation controller. The converter module 522a is attached to the attachment board 522b of the power source control unit 522. The attachment board 522b may be either the same as or separate from the attachment board 521b of the drive control unit 521.

Connected to the inverter module 521a of the drive control unit 521 are the drive motor 51 of the drive unit 50, the battery 60, and the converter module 522a of the power source control unit 522. The motor controller of the inverter module 521a controls operations of the drive motor 51 by controlling on/off-operation of each switching part of the inverter.

Connected to the converter module 522a of the power source control unit 522 are the electric power generator 42 of the electric power generation unit 40 and the battery 60. The electric power generation controller of the converter module 522a controls the converter, to rectify a three-phase AC outputted from the electric power generator 42, and to control a voltage outputted from the electric power generator 42.

The gear box 53 accommodates the rotational power transmission mechanism 531 and an output shaft 534. A drive pulley 535 is attached to the output shaft 534. The rotational power transmission mechanism 531 constitutes a speed reducer, for example. The rotational power transmission mechanism 531 reduces the speed of power outputted from the drive motor 51 with a predetermined gear ratio, and transmits the resulting power to the rear wheel 32. In detail, rotational power from the drive motor 51 is subjected to speed reduction by the rotational power transmission mechanism 531, which is the speed reducer, and then is received by the output shaft 534. The rotational power received by the output shaft 534 goes through the drive pulley 535 and a belt chain 54, and then is received by a drive shaft of the rear wheel 32 serving as the driving wheel.

In the front-back direction FB of the straddled vehicle 1 including the frontward direction F and the backward direction B, the gear box 53 is rigidly fixed at three or more points (e.g., four points in this embodiment) to a rear end portion of the frame body 11. To be specific, the frame body 11 is in contact with and fixed to the gear box 53 at four points without interposition of an elastic member such as a rubber, the four points being attachment portions 561 to 564 of the gear box 53 shown in FIG. 4 to FIG. 7. The attachment portion 561 is disposed in an upper left portion of the gear box 53, and the attachment portion 562 is disposed in a lower left portion of the gear box 53. The attachment portion 563 is disposed in an upper right portion of the gear box 53, and the attachment portion 564 is disposed in a lower right portion of the gear box 53. Supporting is implemented by fixing with bolts, for example.

Since the gear box 53 is rigidly fixed to the frame body 11, the gear box 53 and the frame body 11 are unified to constitute the frame structure 10. Thus, the gear box 53 cooperates with the frame body 11 to form a framework of the straddled vehicle 1, and can bear loads from the front wheel 22, the rear wheel 32, and the electric power generation unit 40.

Referring to FIG. 4 to FIG. 7, the rear arm 31 is supported in a swingable manner by the gear box 53 at two points, namely, the attachment portions 571 and 572 disposed in the gear box 53. The attachment portion 571 is disposed in a left portion of the gear box 53, and the attachment portion 572 is disposed in a right portion of the gear box 53. In detail, the output shaft 534 of the rotational power transmission mechanism 531 penetrates through the attachment portion 571 and the rear arm 31. An attachment bolt 573 (see FIG. 7), which penetrates through the rear arm 31, is received in the attachment portion 572 of the gear box.

The frame structure 10 and the rear arm 31 are connected to each other by a damping device (not shown). The damping device absorbs vibration given from the rear arm 31. This reduces vibration that is transmitted from the rear wheel 32 to the frame structure 10 via the rear arm 31.

In the series hybrid type straddled vehicle 1 of this embodiment, the electric power generation unit 40, which includes the electric power generator 42 and the electric power generation engine 41, is unsupported by the rear arm 31 but by the frame structure 10. In the series hybrid type straddled vehicle 1 having such a configuration, the electric power generation engine 41 is off-set toward the right direction R from the center of the series hybrid type straddled vehicle 1 with respect to the left-right direction LR, and the electric power generator 42 is positioned farther to the left direction L than the electric power generation engine. This allows the electric power generator 42 and the electric power generation engine 41 to be arranged with an overlap with each other when viewed in the left-right direction LR, while suppressing the amount of protrusion of the electric power generator 42 in the left direction L.

The electric power generation engine 41 and the electric power generator 42 of the series hybrid type straddled vehicle 1 are large in size, in order to keep up with an increase of electric power that can be supplied to the drive motor 51.

In the series hybrid type straddled vehicle 1 of this embodiment, the electric power generator 42 and the electric power generation engine 41 are arranged so as to have an overlap with each other when viewed in the left-right direction LR. This makes it possible that the increase in the dimensional amount of the entire electric power generation unit 40 is smaller in the up-down direction UD and front-back direction FB than the increase in the total dimensional amount of both electric power generation engine 41 and electric power generator 42 when not arranged side-by-side. Accordingly, even when both the electric power generation engine 41 and the electric power generator 42 are, in order to meet the requirement for an increased output, large in size, a size increase of the electric power generation unit 40 in the up-down direction UD and front-back direction FB is suppressed. The dimension of the electric power generation unit 40 in the up-down direction UD and front-back direction FB has a large influence on the size of a wheelbase and a frame of the series hybrid type straddled vehicle 1. In the series hybrid type straddled vehicle 1 of this embodiment, a size increase of the vehicle is suppressed.

[Variation]

Figure 8:
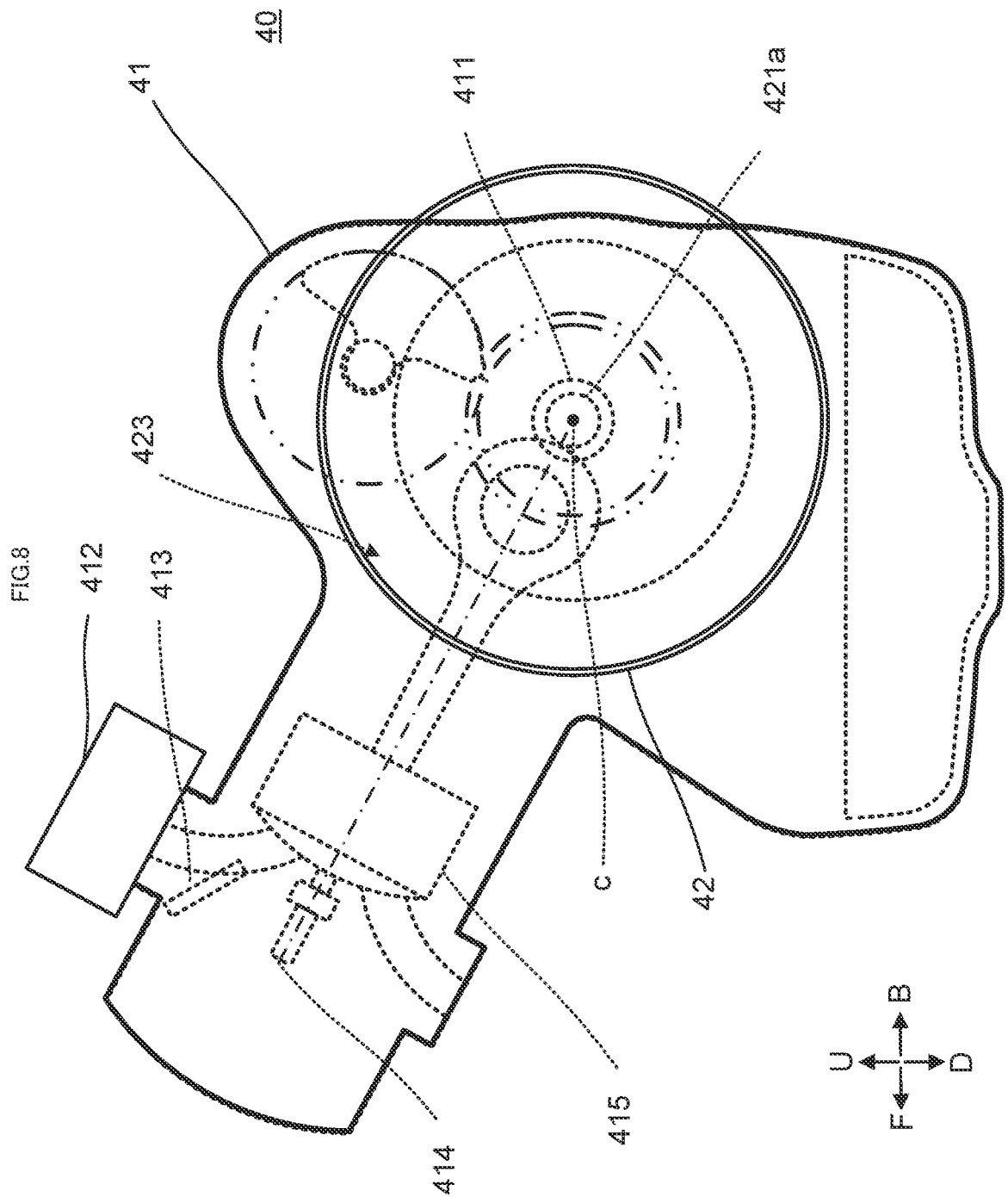
FIG. 8 A left side view showing a variation of how an electric power generator and an electric power generation engine of an electric power generation unit are arranged in the straddled vehicle shown in FIG. 1

The electric power generator 42 and the electric power generation engine 41 of the electric power generation unit 40 may be arranged as follows. FIG. 8 is a diagram showing a variation of how the electric power generator 42 and the electric power generation engine 41 are arranged. As shown in FIG. 8, the electric power generator 42 may be directly coupled to the crankshaft 411 of the electric power generation engine 41 without interposition of the drive gear 423a and the driven gear 423b serving as the rotational power transmission mechanism. In this variation, the driven shaft 421a of the electric power generator 42 and the crankshaft 411 of the electric power generation engine are disposed on a unified axis line c.

Second Embodiment

Figure 9:
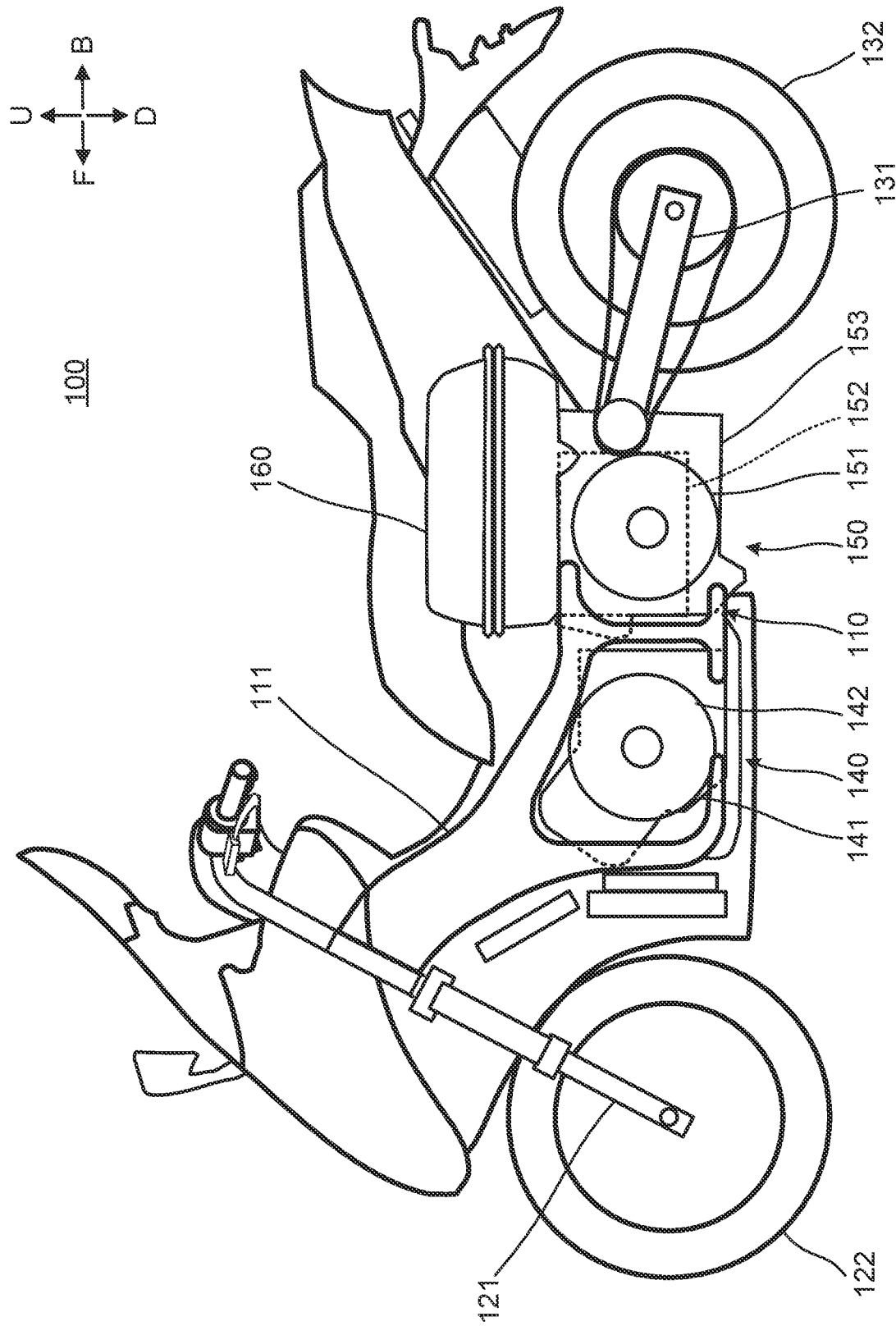
FIG. 9 A diagram showing an external appearance of a straddled vehicle according to a second embodiment of the present teaching FIG. 10 A diagram showing an external appearance of a straddled vehicle according to a third embodiment of the present teaching FIG. 11 A diagram showing an external appearance of a straddled vehicle according to a fourth embodiment of the present teaching

FIG. 9 is a diagram showing an external appearance of a straddled vehicle 100 according to a second embodiment of the present teaching. FIG. 9 shows a state where a left one of vehicle body coverings in the left-right direction LR of the straddled vehicle 100 is removed. The straddled vehicle 100 according to this embodiment is different from the straddled vehicle 1 according to the first embodiment, in terms of how an electric power generation unit 140 is supported. Differences of this embodiment from the first embodiment will only be described below.

The electric power generation unit 140 is rigidly fixed to a frame structure 110. More specifically, the electric power generation unit 140 is supported by a frame body 111 of the frame structure 110. The electric power generation unit 140 is attached at three or more points to the frame body 111 while being in contact with the frame body 111 without interposition of an elastic member such as a rubber. Since the electric power generation unit 140 is rigidly fixed to the frame body 111, the electric power generation unit 140 is unified with the frame body 111 and a drive unit 150, to constitute the frame structure 110. The electric power generation unit 140 cooperates with the frame body 111 and the drive unit 150 to form a framework of the straddled vehicle 100, and can bear loads from a front wheel 122 and a rear wheel 132.

Third Embodiment

Figure 10:
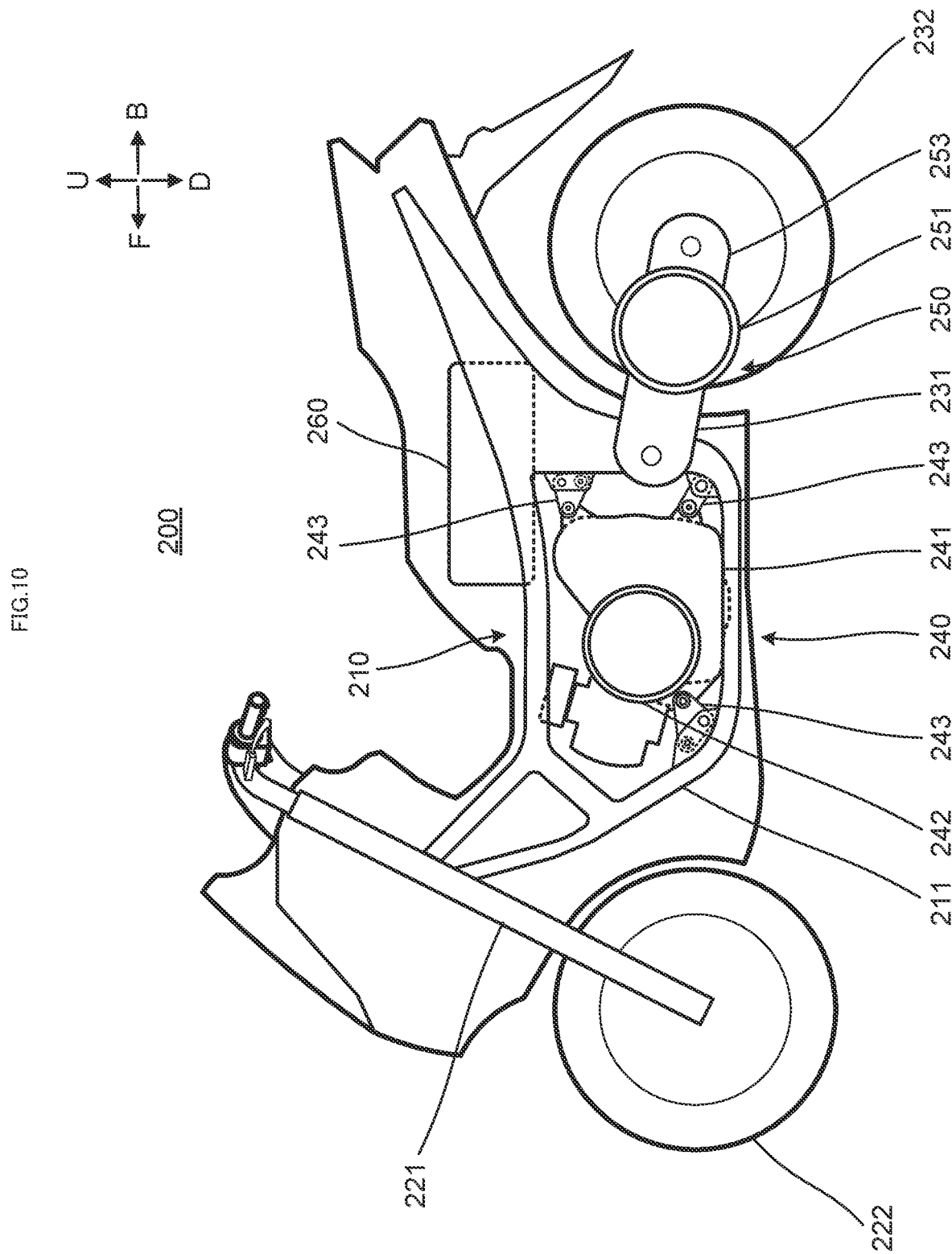

FIG. 10 is a diagram showing an external appearance of a straddled vehicle 200 according to a third embodiment of the present teaching. FIG. 10 shows a state where a left one of vehicle body coverings is removed. The straddled vehicle 200 according to this embodiment is different from the straddled vehicle 1 according to the first embodiment, in terms of how an electric power generation unit 240 is supported, how a drive unit is configured, and how supporting is made between a frame body and the drive unit. Differences of this embodiment from the first embodiment will only be described below.

A drive unit 250 includes a drive motor 251 and a gear box 253. In this embodiment, the gear box 253 constitutes a rear arm 231. The drive motor 251 is attached to the gear box 253.

In this embodiment, the gear box 253 is supported by a frame body 211 such that the gear box 253, which constitutes the rear arm 231, can swing integrally with the drive motor 251. In this embodiment, therefore, the drive unit 250 does not constitute a frame structure 210. That is, in this embodiment, the frame structure 210 consists of the frame body 211 alone.

The electric power generation unit 240 is supported by the frame body 211 of the frame structure 210 via fixtures 243 each including a link member and an elastic member such as a rubber bush. The electric power generation unit 240 may be supported by the frame body 211 of the frame structure 210 via an elastic member such as a rubber.

(Variation)

The drive unit 250 may be configured so as not to include the gear box 253. In a variation of this embodiment, the drive motor 251 is attached to the rear arm 231, and the drive motor 251 has an output shaft to which a center shaft of a rear wheel 232 is directly connected. That is, the drive motor 251 is configured as an in-wheel motor in the rear wheel 232.

Fourth Embodiment

Figure 11:
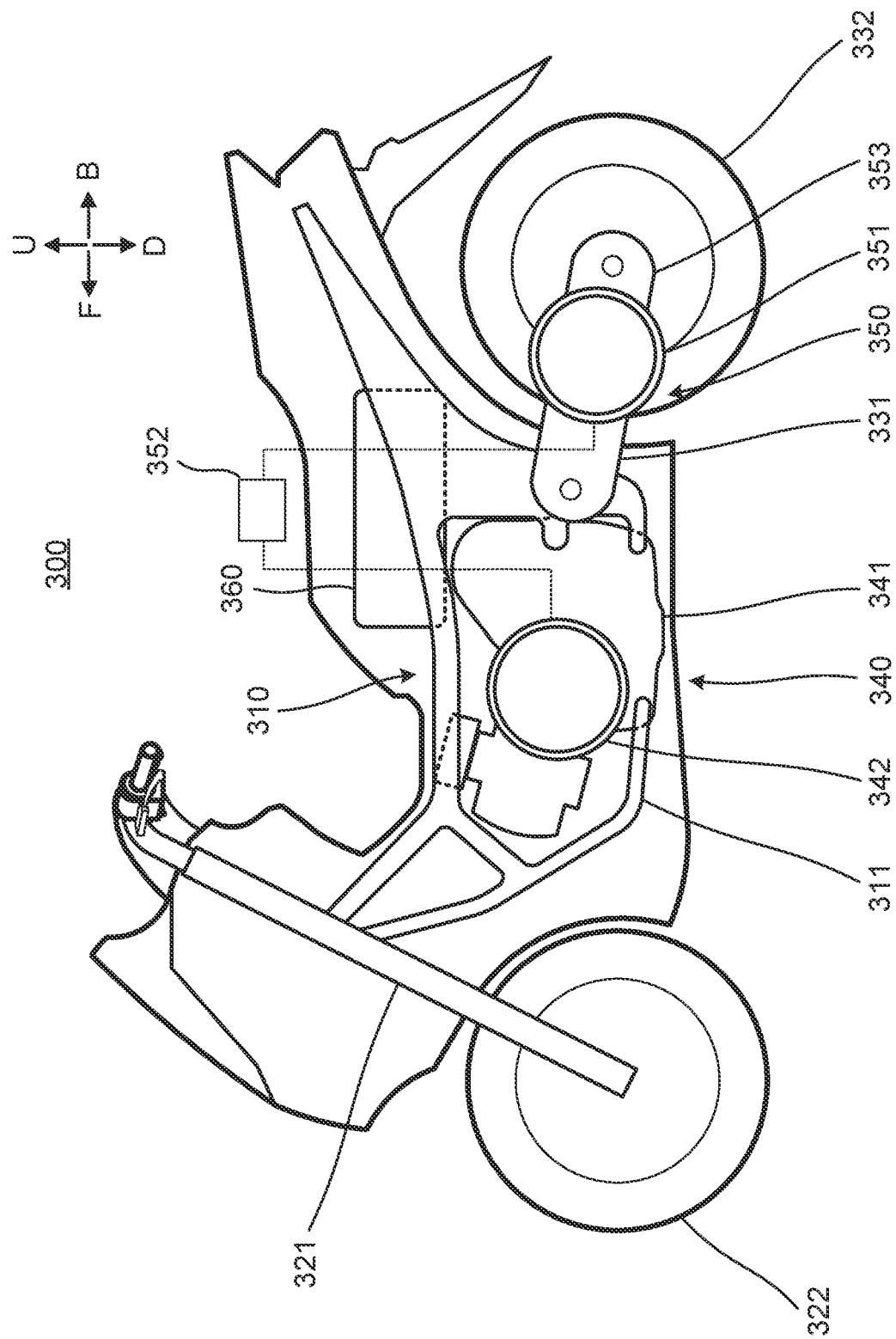

FIG. 11 is a diagram showing an external appearance of a straddled vehicle 300 according to a fourth embodiment of the present teaching. FIG. 11 shows a state where a left one of vehicle body coverings is removed. The straddled vehicle 300 according to this embodiment is different from the straddled vehicle 1 according to the first embodiment, in terms of how an electric power generation unit 340 is supported, how a drive unit 350 is configured, and how supporting is made between a frame body 311 and the drive unit 350. Differences of this embodiment from the first embodiment will only be described below.

The electric power generation unit 340 is rigidly fixed to a frame structure 310. More specifically, the electric power generation unit 340 is supported by the frame body 311 of the frame structure 310. The supporting is implemented in such a manner that the electric power generation unit 340 is fixed at three or more points to the frame body 311 while being in contact with the frame body 311 without interposition of an elastic member such as a rubber. Since the electric power generation unit 340 is rigidly fixed to the frame body 311, the electric power generation unit 340 is unified with the frame body 111 to constitute the frame structure 310. Thus, the electric power generation unit 340 cooperates with the frame body 311 to form a framework of the straddled vehicle 300, and can bear loads from a front wheel 322 and a rear wheel 332.

The drive unit 350 includes a drive motor 351 and a gear box 353. In this embodiment, the gear box 353 constitutes a rear arm 331. The drive motor 351 is attached to the gear box 353.

In this embodiment, the gear box 353 is supported by the frame body 311 such that the gear box 353, which constitutes the rear arm 331, can swing integrally with the drive motor 351. In this embodiment, therefore, the drive unit 350 does not constitute the frame structure 310. That is, in this embodiment, the frame structure 310 is composed of the frame body 311 and the electric power generation unit 340.

In this embodiment, the drive unit 350 may or may not include a control unit 352. Although FIG. 11 does not clearly show a position at which the control unit 352 is arranged, the control unit 352 of this embodiment may either be unified with the drive unit 350 to constitute a rear arm, or be attached to the frame structure 310 of the straddled vehicle 1.

(Variation)

It may be possible that the drive unit 350 is configured so as not to include the gear box 353. In a variation of this embodiment, the drive motor 351 is attached to the rear arm 331, and the drive motor 351 has an output shaft to which a center shaft of the rear wheel 332 is directly connected. That is, the drive motor 351 is configured as an in-wheel motor in the rear wheel 332.

REFERENCE SIGNS LIST 1, 100, 200, 300 straddled vehicle
10, 110, 210, 310 frame structure
11, 111, 211, 311 frame body
21 front fork
22, 122, 322 front wheel
31, 231, 331 rear arm
32, 132, 332 rear wheel
40, 140, 340 electric power generation unit
41 electric power generation engine
42 electric power generator
50, 150, 250, 350 drive unit
51, 251, 351 drive motor
52, 252, 352 control unit
53, 253, 353 gear box
60 battery

The invention claimed is:

1. A straddled vehicle that is a series hybrid vehicle, comprising:
a frame structure including a frame body;
a rear arm that is swingably supported by the frame structure;
a driving wheel that is rotatably supported by the rear arm;
a drive motor that is supported by the frame structure or the rear arm, the drive motor being configured to drive the driving wheel; and
an electric power generation unit including an electric power generation engine and an electric power generator, wherein
the electric power generation engine has either a single cylinder or two cylinders, to thereby define a center plane thereof that is either
a vertical plane in which a center line of the single cylinder lies when the straddled vehicle is in an upright state,
or
a vertical plane in which any point is of an equal distance to two center lines of the two cylinders;
the center plane of the electric power generation engine is arranged with an offset toward a first direction from a center plane of the straddled vehicle with respect to a left-right direction of the straddled vehicle, and is positioned not to overlap the drive motor when viewed in the left-right direction;
the electric power generator is positioned further in a second direction than the electric power generation engine, and is arranged to overlap the electric power generation engine, but not to overlap the drive motor, when viewed in the left-right direction, the second direction being in the left-right direction of the straddled vehicle and being opposite to the first direction; and
the electric power generator is driven by the electric power generation engine to generate electric power for driving the drive motor, the electric power generation unit being supported by the frame body, and not being supported by the rear arm, such that the electric power generation unit constitutes the frame structure or does not constitute the frame structure.

2. The straddled vehicle according to claim 1, wherein the electric power generation unit is swingably supported by the frame body, and such that the electric power generation unit does not constitute the frame structure.

3. The straddled vehicle according to claim 2, further comprising a gear box that accommodates a rotational power transmission mechanism, the rotational power transmission mechanism shifting a speed of power outputted from the drive motor with a predetermined gear ratio, and transmitting resulting power to the driving wheel, wherein
the gear box is rigidly fixed to the frame body, to thereby form the frame structure along with the frame body, and
the drive motor is supported by the gear box.

4. The straddled vehicle according to claim 2, wherein the drive motor is supported by the rear arm, and drives the driving wheel without transmission of rotational power.

5. The straddled vehicle according to claim 2, wherein the rear arm supports the drive motor, and accommodates a rotational power transmission mechanism, the rotational power transmission mechanism shifting a speed of power outputted from the drive motor with a predetermined gear ratio, and transmitting resulting power to the driving wheel, and
the drive motor drives the driving wheel via the rotational power transmission mechanism.

6. The straddled vehicle according to claim 1, wherein the electric power generation unit is rigidly fixed to the frame body, to thereby form the frame structure along with the frame body.

7. The straddled vehicle according to claim 6, further comprising a gear box that accommodates a rotational power transmission mechanism, the rotational power transmission mechanism shifting a speed of power outputted from the drive motor with a predetermined gear ratio, and transmitting resulting power to the driving wheel, wherein
the gear box is rigidly fixed to the frame body, to thereby form the frame structure along with the frame body, and
the drive motor is supported by the gear box.

8. The straddled vehicle according to claim 6, wherein
the drive motor is supported by the rear arm, and drives the driving wheel without transmission of rotational power.

9. The straddled vehicle according to claim 6, wherein
the rear arm supports the drive motor, and accommodates a rotational power transmission mechanism, the rotational power transmission mechanism shifting a speed of power outputted from the drive motor with a predetermined gear ratio, and transmitting resulting power to the driving wheel, and
the drive motor drives the driving wheel via the rotational power transmission mechanism.

10. The straddled vehicle according to claim 1, further comprising a gear box that accommodates a rotational power transmission mechanism, the rotational power transmission mechanism shifting a speed of power outputted from the drive motor with a predetermined gear ratio, and transmitting resulting power to the driving wheel, wherein
the gear box is rigidly fixed to the frame body, to thereby form the frame structure along with the frame body, and
the drive motor is supported by the gear box.

11. The straddled vehicle according to claim 1, wherein
the drive motor is supported by the rear arm, and drives the driving wheel without transmission of rotational power.

12. The straddled vehicle according to claim 1, wherein
the rear arm supports the drive motor, and accommodates a rotational power transmission mechanism, the rotational power transmission mechanism shifting a speed of power outputted from the drive motor with a predetermined gear ratio, and transmitting resulting power to the driving wheel, and
the drive motor drives the driving wheel via the rotational power transmission mechanism.

* * * * *